United States Patent
Allen et al.

(10) Patent No.: US 7,815,084 B2
(45) Date of Patent: Oct. 19, 2010

(54) READY-TO-RIDE BICYCLE CARRIER ASSEMBLY

(75) Inventors: Scott R. Allen, Fieldbrook, CA (US); Joseph J. Settelmayer, Fieldbrook, CA (US); Mark Early, Kneeland, CA (US)

(73) Assignee: Yakima Products, Inc., Beaverton, OR (US)

( * ) Notice: Subject to any disclaimer, the term of this patent is extended or adjusted under 35 U.S.C. 154(b) by 0 days.

(21) Appl. No.: 11/111,301

(22) Filed: Apr. 20, 2005

(65) Prior Publication Data

US 2006/0029483 A1 Feb. 9, 2006

Related U.S. Application Data

(60) Provisional application No. 60/563,909, filed on Apr. 20, 2004, provisional application No. 60/601,510, filed on Aug. 12, 2004, provisional application No. 60/645,558, filed on Jan. 19, 2005.

(51) Int. Cl.
*B60R 9/00* (2006.01)
*B60R 11/00* (2006.01)

(52) U.S. Cl. ................. 224/537; 224/519; 224/924

(58) Field of Classification Search ........... 224/519, 224/495, 501, 504, 509, 537, 505, 518, 521, 224/536, 502; 211/19, 20; 414/462
See application file for complete search history.

(56) References Cited

U.S. PATENT DOCUMENTS

| | | | | |
|---|---|---|---|---|
| 3,240,406 A | * | 3/1966 | Logan | 224/519 |
| 3,529,737 A | * | 9/1970 | Daugherty | 414/462 |
| 4,702,401 A | * | 10/1987 | Graber et al. | 224/536 |
| 4,875,608 A | * | 10/1989 | Graber | 224/493 |
| 5,445,300 A | * | 8/1995 | Eipper et al. | 224/496 |
| 5,570,825 A | * | 11/1996 | Cona | 224/495 |
| 5,820,002 A | * | 10/1998 | Allen | 224/324 |
| 6,053,336 A | * | 4/2000 | Reeves | 211/20 |
| 6,439,397 B1 | * | 8/2002 | Reeves | 211/17 |
| 6,491,195 B1 | * | 12/2002 | McLemore et al. | 224/537 |
| 6,523,731 B1 | * | 2/2003 | Pedrini | 224/537 |

(Continued)

FOREIGN PATENT DOCUMENTS

EP          1285817 A2 *  2/2003

*Primary Examiner*—Nathan J Newhouse
*Assistant Examiner*—Corey N Skurdal
(74) *Attorney, Agent, or Firm*—Kolisch Hartwell, P.C.

(57) ABSTRACT

A ready-to-ride bicycle carrier assembly. The ready-to-ride bicycle assembly includes a frame having a front portion and a rear portion. The front portion of the frame includes a wheel well configured to support a first wheel of the bicycle. A wheel holder is located at the rear portion of the frame and is configured to support a second wheel of the bicycle. An arm is pivotably connected to the frame, and a gripping member is selectively moveable along a length of the arm. The gripping member is configured to be selectively positioned to secure the bicycle on the carrier. In some embodiments, the wheel well includes terraced sidewalls adapted to secure tires having different widths. In some embodiments, an upper rim portion of the wheel well assembly is longitudinally asymmetrical. In some embodiments, the carrier includes a wheel brace configured to wrap around a portion of the first wheel that is above the wheel well. In some embodiments, the wheel holder is pivotably connected to the rear portion of the frame.

21 Claims, 4 Drawing Sheets

U.S. PATENT DOCUMENTS 6,736,301 B1 * 5/2004 Huang ......................... 224/500
6,761,297 B1 * 7/2004 Pedrini ........................ 224/519
6,968,986 B1 * 11/2005 Lloyd et al. ................. 224/507

* cited by examiner

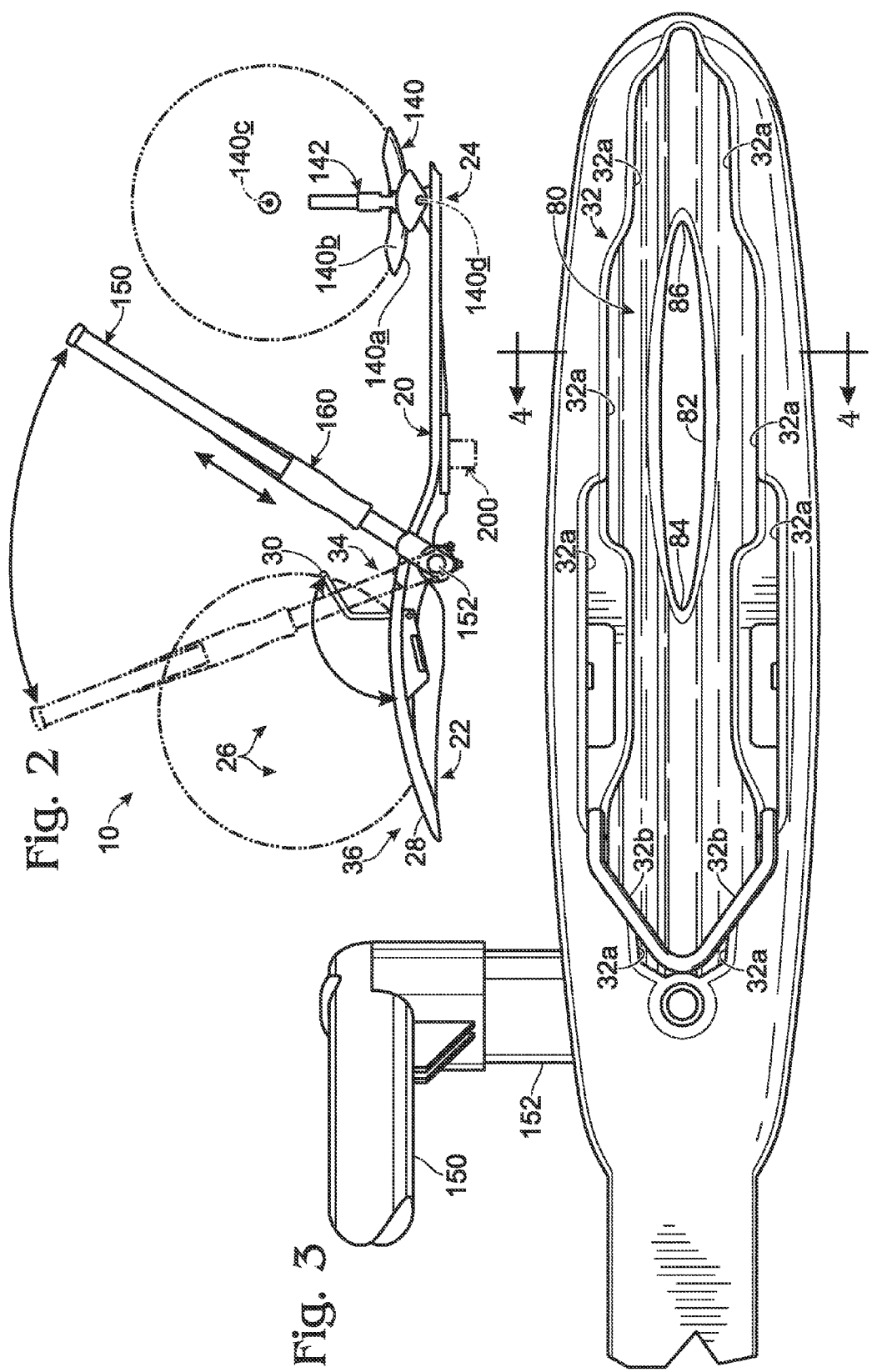

READY-TO-RIDE BICYCLE CARRIER ASSEMBLY

CROSS-REFERENCES

This application claims the benefit of U.S. Provisional Applications 60/563,909, filed Apr. 20, 2004, 60/601,510, filed Aug. 12, 2004, and 60/645,558, filed Jan. 19, 2005, each of which are incorporated by reference for all purposes.

BACKGROUND

There are many different types of bicycle racks for securing bicycles to a variety of different vehicles. For example, there are racks for carrying bicycles on top of a car, behind a car, in the bed of a pick-up, on the front of a bus, etc. Many bicycle racks secure a bike at least in part by gripping a portion of the bike frame. However, whereas in the past, most bicycle frames have had a fairly standard frame configuration, many newer bicycles vary drastically from the traditional design. Some bicycles have suspension systems for off-road riding. Some bicycles are designed to fold for compact storage or travel. Recumbent and tandem bicycles are now common. Bicycle frame tubing has also become more varied. In attempts to lighten bicycle frames without sacrificing strength, new metal alloys and synthetic materials are used to make frame tubes, and tubes constructed from these materials are often differently sized and shaped compared to traditional steel tubing. It has been difficult to design a bicycle rack that works well with a variety of differently configured bicycles. It has been particularly challenging designing such a rack that can quickly and easily be loaded and unloaded with a bicycle.

BRIEF DESCRIPTION OF THE DRAWINGS

FIG. 2 shows a detailed view of the ready-to-ride bicycle carrier of FIG. 1.

FIG. 3 shows a top view of a wheel well of the ready-to-ride bicycle carrier of FIG. 1.

DETAILED DESCRIPTION

Figure 1:
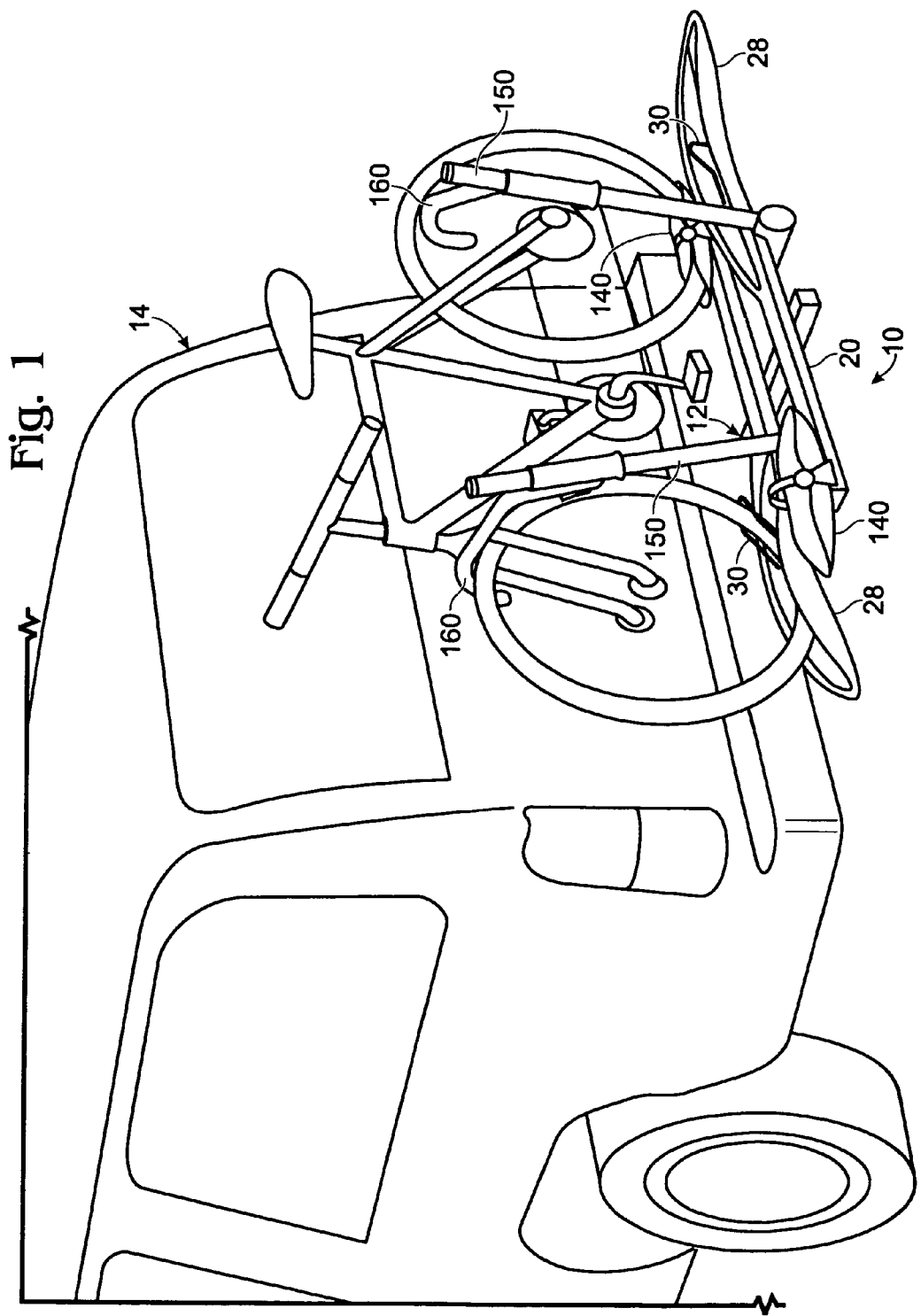
FIG. 1 shows a ready-to-ride bicycle carrier assembly mounted to the hitch of a motorized vehicle.

FIG. 1 shows a bike carrier 10 mounted to a hitch 12 of a vehicle 14. Bike carriers can additionally or alternatively be configured to mount to a roof rack of a vehicle, mount on the trunk or hatchback of a vehicle, or otherwise be secured to the vehicle. Bike carrier 10 is designed to fold up and out of the way when it is not carrying one or more bicycles. As illustrated, bike carrier 10 is shown in a down position, in which bicycles can be carried. A bike carrier can be configured to carry one, two, three, four, or even more bicycles. As illustrated, bike carrier 10 is configured to carry two bicycles.

FIG. 2 shows a more detailed view of bike carrier 10. The bike carrier includes a frame 20, which includes a front portion 22 and a rear portion 24. As shown in FIG. 1, the front portion can be used to hold a front bicycle wheel. In some embodiments, the front portion can be used to hold a rear bicycle wheel. A wheel well assembly 26 is located near front portion 22. The wheel well assembly can include a wheel well 28 and a wheel brace 30, which can cooperate to stabilize a bicycle wheel.

As shown in FIG. 3, wheel well assembly 26 has an upper rim 32, a portion 32a of which is formed by wheel well 28, and a portion 32b of which is formed by wheel brace 30. In some embodiments, the upper rim may be formed by the wheel well alone, and in some embodiments, the upper rim may be formed by a combination of the wheel well and one or more different components. The wheel well assembly will generally be configured to provide a bicycle wheel with enough support to safely transport a bicycle when the bicycle is held in place by one or more bicycle securing means, examples of which are described below.

As can be seen in FIG. 2, the upper rim of the wheel well assembly is longitudinally asymmetrical. While the wheel well itself can be substantially symmetrical in a longitudinal direction, the wheel brace can extend above the top of a posterior portion 34 of the wheel well, providing the wheel well assembly with an overall longitudinal asymmetry. In other words, the posterior portion of the wheel well assembly is higher than an anterior portion 36 of the wheel well assembly. As explained in more detail below, such an asymmetrical arrangement can help resist a forward to backward movement of a bicycle in the bicycle carrier, while at the same time presenting a relatively shallow wheel well that is easy to load. In some embodiments, the wheel well itself, without the addition of a wheel brace, can be shaped with an upper rim portion that is longitudinally asymmetrical, and/or has a posterior portion that is relatively higher than an anterior portion. A longitudinally asymmetrical upper rim portion does not necessarily, and typically will not, require horizontal asymmetry.

Figure 4:
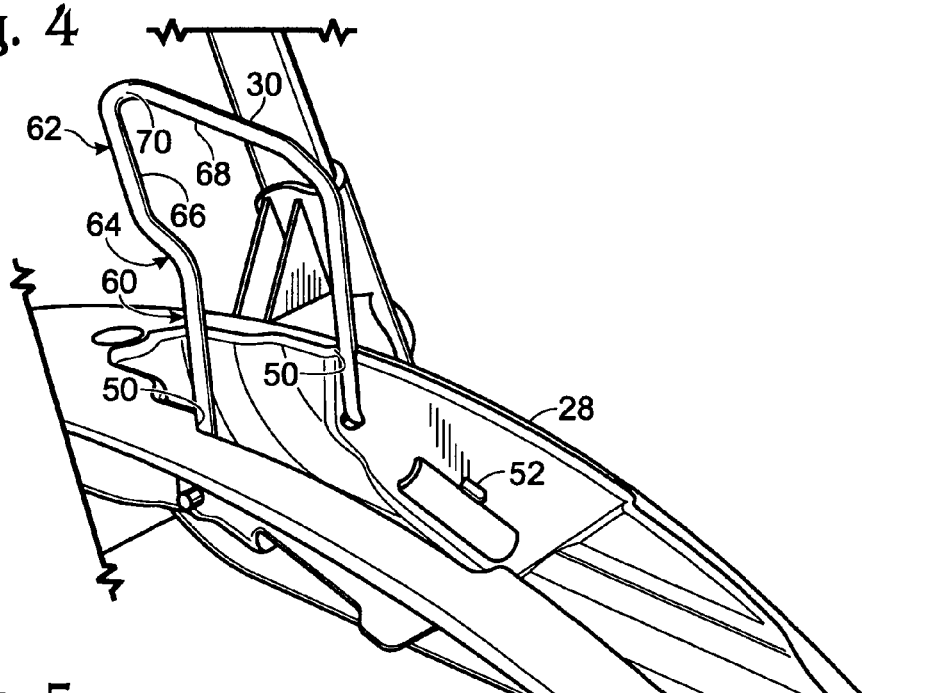
FIG. 4 shows the ready-to-ride bicycle carrier of FIG. 1 with a wheel brace in a carrying position.
Figure 5:
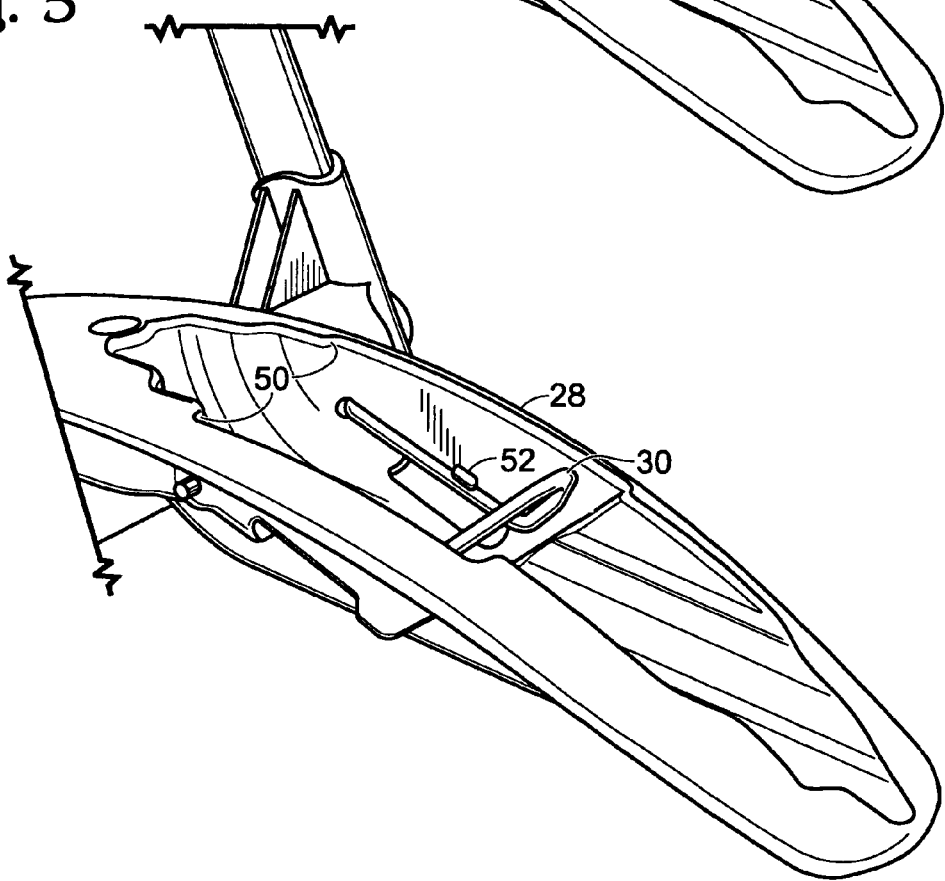
FIG. 5 shows the ready-to-ride bicycle carrier of FIG. 1 with a wheel brace in a stowed position.

As shown in FIGS. 4 and 5, wheel brace 30 may be selectively pivotable relative wheel well 28. As such, the wheel brace can move between at least two different distinct positions. In FIG. 4, the wheel brace is shown in a carrying position in which it can wrap around a portion of a bicycle wheel. Due to the longitudinal asymmetry of the upper rim portion of the wheel well assembly, the wheel brace contacts the bicycle wheel above the wheel well when it is in the carrying position. Being positioned relatively higher on the bicycle wheel can help prevent the bicycle wheel from rolling backwards in the carrier. The wheel well can include one or more carrying stops 50, which can orientate the wheel brace in a carrying position. In FIG. 5, wheel brace 30 is shown in a stowed position. The wheel well can include one or more stowing stops 52, which can orientate the wheel brace in a stowed position.

In some embodiments, the wheel brace can be constructed from a rigid wire, or a similar structure, although this is not required. The wheel brace can include a riser portion 60 and a wheel contacting portion 62, which can meet at a bend 64 of the wheel brace. The wheel contacting portion of the wheel brace can include opposing side-wheel wrapping portions 66 and 68 that can respectively brace the left and right sides of a tire, rim, and/or other portions of the wheel. Side-wheel wrapping portions can provide lateral stability to a loaded bicycle, helping to prevent the bicycle from tipping over in the rack. Exemplary wheel brace 30 also includes a tread wrapping portion 70 interposed between the side-wheel wrapping portions. The tread wrapping portion can resist forward to backward movement of the bicycle on the rack. Wheel brace 30 can simplify the task of loading a bicycle into the rack. In particular, the wheel brace can provide stability to a bicycle before a bike securing means is positioned to hold the bike in place, allowing the bike to temporarily rest upright in the rack without tipping over while the bike securing means is activated.

Turning back to FIG. 3, the wheel well can include a bottomless trough 80 that is defined by upper rim 32a and a lower rim 82, and the surface therebetween. Lower rim 82 can have opposing wheel contacting portions 84 and 86 that can help cradle a wheel that is inserted into the wheel well. A wheel well can be sized to fit a particular wheel size and/or range of wheel sizes. The distance between contacting portions 84 and 86 can be selected to be spaced close enough together so that a small wheel will not drop all the way through trough 80, while at the same time being spaced far enough apart so that relatively large wheels can securely sit into the trough. Just as the size of the opening of the bottom of the wheel well can be selected to accommodate a desired range of wheel sizes, so can the curvature of the bottom of the wheel well. The illustrated embodiment is one nonlimiting example. In some embodiments, the wheel well can include a bottom.

Figure 6:
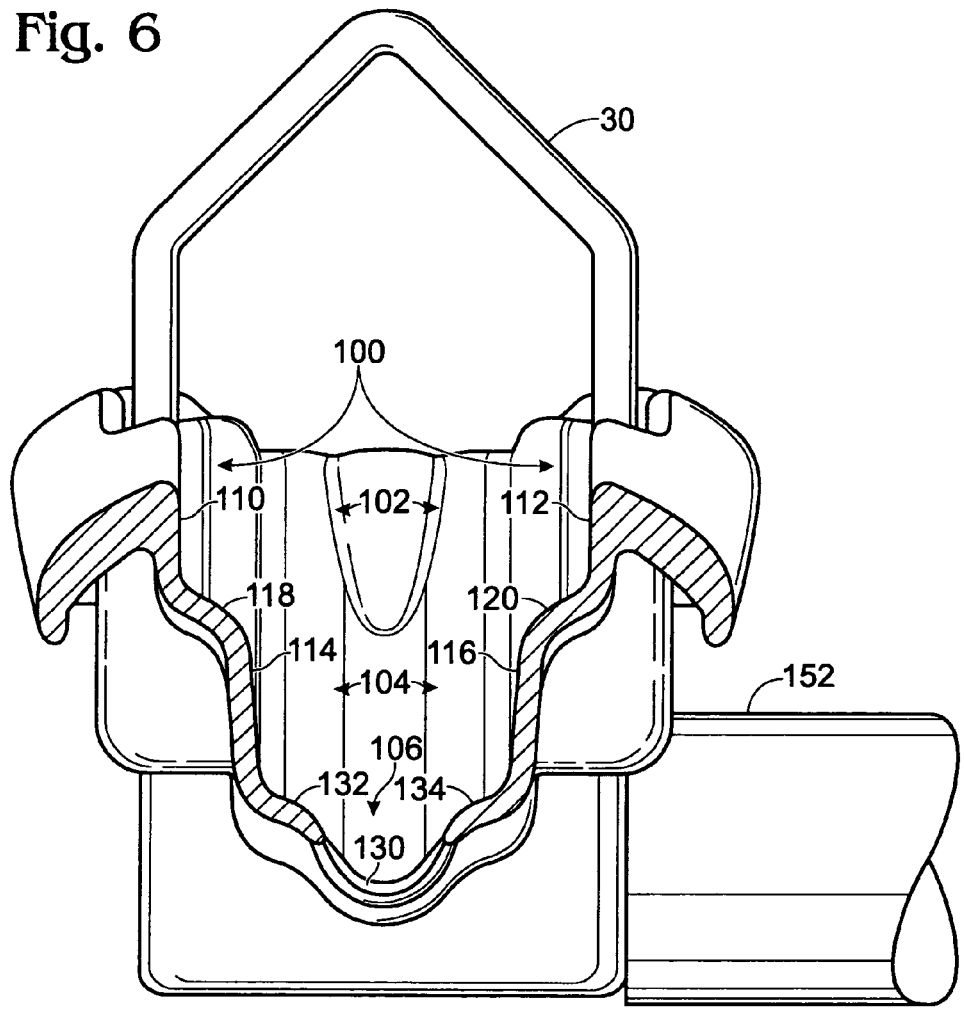
FIG. 6 shows a cross-sectional view of a wheel well portion of the ready-to-ride bicycle carrier of FIG. 1.

Some bicycles, such as downhill mountain bikes, have relatively wide tires, while other bikes, such as road bikes, have relatively narrow tires. Because of the variation in tire sizes, it can be difficult for a single rack to accommodate a variety of different bicycle types. As illustrated in FIG. 6, the wheel well can have a terraced sidewall 100, which can facilitate the carrying of bicycles having tires with different widths. For example, terraced sidewall 100 defines an upper portion 102 sized to hold a mountain bicycle tire, or the like, an intermediate portion 104 designed to hold a cross or hybrid bicycle tire, or the like, and a lower portion 106 designed to hold a road bicycle tire, or the like.

Terraced sidewall 100 is configured so that tires having a relatively large rolling surface sit higher in the wheel well, while tires having a relatively narrow rolling surface sit lower in the wheel well. The cross-sectional profile of the sidewalls is designed so that tires having different popular sizes can be secured at least partially from the side. In particular, the tray is shaped so the most popular tire sizes will receive enough lateral support to limit side-to-side movement of a tire within the tray. The lateral support can also help prevent the bicycle to which the tire is connected from excessive leaning.

Terraced sidewalls can be variously configured depending on the particular sizes of bicycle tires which are to be carried. In the nonlimiting example shown in FIG. 6, the terraced sidewall includes first upright opposing portions 110 and 112 that form the lateral boundaries of upper portion 102 and second upright opposing portions 114 and 116 that form the lateral boundaries of intermediate portion 104. First opposing bridge portions 118 and 120 connect first upright opposing portions 110 and 112 to second upright opposing portions 114 and 116. First opposing bridge portions 118 and 120 form the lower boundary of upper portion 102 and serve as a bottom support for mountain bicycle tires, or the like, which can be about 2.6 inches or wider. Terraced sidewall 100 also includes a trough portion 130 at the bottom of the wheel well. Trough portion 130 is sized to hold a road bicycle tire, or the like, which can range from about 2 centimeters to 3 centimeters (road bicycle tires are typically measured using the metric system, while other tires are measured using the English system). Second opposing bridge portions 132 and 134 connect second upright portions 114 and 116 to trough portion 130. Second opposing bridge portions 132 and 134 form the lower boundary of intermediate portion 104 and serve as a bottom support for hybrid bicycle tires, or the like, which can range from about 1 inch to 2 inches.

In general, upright, or substantially upright, opposing sidewall portions will have a relatively vertical orientation compared to the opposing bridge portions. However, in some embodiments, the sidewalls may be more continuously terraced, or slanted, with less definitive segmentation. In the illustrated embodiment, the upright opposing portions are not completely vertical or parallel to one another. In some embodiments, the upright portions can be vertical. Upright opposing portions can be referred to as being substantially upright, whether they are completely vertical or not.

FIG. 2 shows a wheel holder 140 located near rear portion 24. The wheel holder can be used to secure the other bicycle wheel, which is not supported by wheel well assembly 26. In the illustrated embodiment, wheel holder 140 is configured differently than wheel well assembly 26. In some embodiments, the wheel holder can be more closely, or identically, configured to the wheel well assembly.

Illustrated wheel holder 140 is configured to pivot relative to frame 20. The pivoting action can increase the effective wheelbase of bicycles that carrier 10 can hold without requiring substantial reconfiguration of the carrier. For example, wheel holder 140 can contact an interior (near the other wheel) bottom quarter of a wheel on a bicycle having a relatively long wheel base, or can pivot to contact an exterior (distal the other wheel) bottom corner of a wheel on a bicycle having a relatively short wheel base. For example, as shown in FIG. 2, wheel holder 140 may accommodate bicycles having different wheel bases by pivoting forward and backward around axis 140d.

As shown in FIG. 2, wheel holder 140 has floor portion 140a and opposing side walls 140b (only one shown). Floor portion 140a is curved around wheel axis 140c corresponding to an axis of a wheel mounted on wheel holder 140. Wheel holder 140 includes a ratcheting strap 142 for securing a bicycle wheel to the wheel holder. Other bicycle securing means can be used in some embodiments. In some embodiments, a wheel holder 140 may not be necessary or may be replaced by a functionally similar, but structurally different, component. As a nonlimiting example, a longitudinally extending tray can be used to support a bicycle wheel instead of the illustrated pivoting wheel holder.

As shown in FIG. 2, carrier 10 includes an arm 150 that is pivotably connected to frame 20 at a joint 152. A gripping member 160 is selectively moveable along a length of the arm. The gripping member is configured to be selectively positioned to secure a bicycle on the carrier. In the illustrated embodiment, the gripping member has two degrees of freedom. First, the gripping member can move in an arc as the arm pivots, thus allowing the gripping member to be aligned with different parts of a carried bicycle. Second, the gripping member can be moved along the length of the arm so that it can hold a bicycle down.

A gripping member that has been positioned to hold a desired part of a bicycle can be fixed in place. In some embodiments, the gripping member can be biased towards a relatively shortened effective length so that the gripping portion automatically cinches down on the desired portion of the bicycle. In some embodiments, the effective length can be selected from a continuous range of possible effective lengths. In some embodiments, the effective length may be selected from a discrete set of preselected effective lengths. As one example, the gripping member may interface with the arm via a ratcheting mechanism that allows the gripping member to selectively move relative to the arm, but also allows the gripping member to be locked at a desired effective length.

Figure 7:
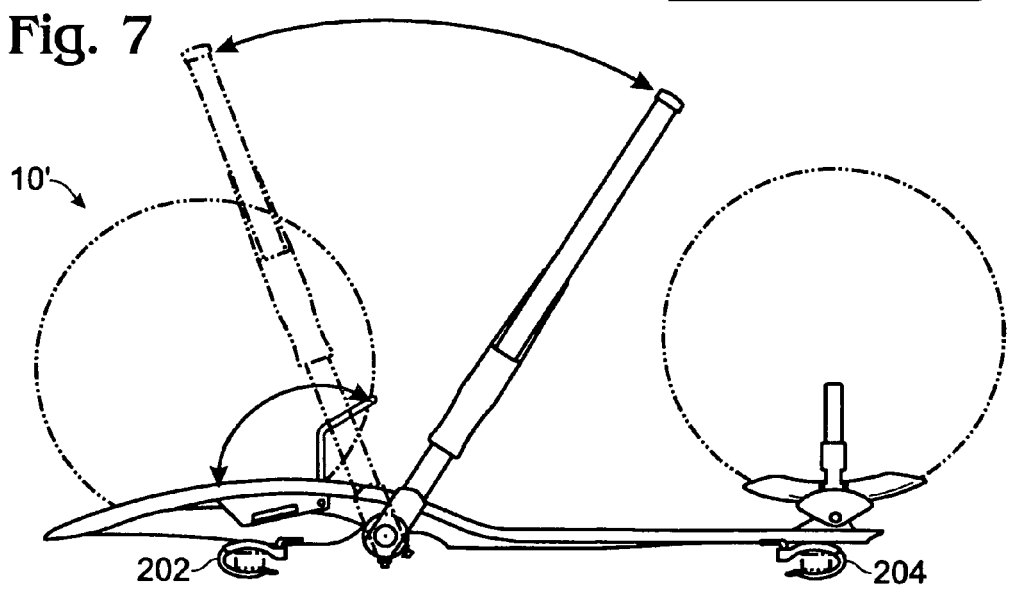
FIG. 7 shows a ready-to-ride bicycle carrier assembly configured to be mounted to a vehicle roof-rack.

As can be seen in FIG. 2, bike carrier 10 includes a mount 200, which is configured to fasten bike carrier 10 to a hitch. FIG. 7 shows a bike carrier 10', which is configured to be mounted to a roof-rack. As such, bike carrier 10' includes mounts 202 and 204, which are configured to fasten the bike carrier to the crossbars of a roof rack.

Although the present disclosure has been provided with reference to the foregoing operational principles and embodiments, it will be apparent to those skilled in the art that various changes in form and detail may be made without departing from the spirit and scope defined in the appended claims. It should be understood that modifications and variations can be made to the disclosed embodiments while remaining within the scope of the appended claims. Where the disclosure or claims recite "a," "a first," or "another" element, or the equivalent thereof, they should be interpreted to include one or more such elements, neither requiring nor excluding two or more such elements. The following U.S. Patents are hereby incorporated herein by reference for all purposes: 5,692,659, 5,169,042, 5,029,740, 4,875,608, 4,823,997, 4,702,401, 4,524,893, 4,437,597, 4,403,716, 4,213,729, 4,171,077, 3,744,689, 1,179,823, 623,807, 615,264, 607,024, 586,681, 576,351, 556,789, 529,827, and 488,395.

The invention claimed is:

1. A carrier for a bicycle, comprising:
a rigid elongate body having a longitudinal axis extending from a front portion through a rear portion, wherein the front portion includes a wheel well configured to support a first wheel of the bicycle, the wheel well including an upper rim, a continuous lower rim that is smaller than the upper rim, and an opening circumscribed by the continuous lower rim, with the lower rim including at least one wheel contacting portion;
a wheel brace pivotably attached to the rigid elongate body adjacent the wheel well, the brace being pivotal around an axis transverse to the longitudinal axis of the rigid elongate body, the wheel brace including a continuous rigid member having ends that are pivotably connected to the rigid elongate body at first and second points along the axis and that is movable between a substantially horizontal position for stowage and a substantially upright position for supporting the first wheel, with the wheel brace and the at least one wheel contacting portion being configured to cooperatively cradle the first wheel;
a wheel holder located at the rear portion of the rigid elongate body and configured to support a second wheel of the bicycle;
an arm pivotably connected to the rigid elongate body; and
a gripping member selectively moveable along a length of the arm; wherein the gripping member is configured to be selectively positioned to secure the bicycle on the carrier.

2. The carrier of claim 1, wherein the wheel well has terraced sidewalls including at least first substantially upright opposing portions separated by a first width and second substantially upright opposing portions separated by a second width that is narrower than the first width, and wherein the first substantially upright opposing portions are connected to the second substantially upright opposing portions by opposing bridge portions that are less upright than either the first substantially upright opposing portions or the second substantially upright opposing portions.

3. The carrier of claim 2, wherein the terraced sidewalls define at least an upper portion configured to secure mountain tires and a lower portion configured to secure road tires.

4. The carrier of claim 1, wherein the wheel holder is pivotably connected to the rear portion of the rigid elongate body, the wheel holder having a floor portion and opposing sidewalls, the floor portion being curved around a wheel axis corresponding to an axis of a wheel mounted on the wheel holder.

5. The carrier of claim 1, wherein the arm is pivotably connected to the rigid elongate body at a location intermediate the wheel well and the rear portion.

6. The carrier of claim 1, wherein the gripping member and the arm are cooperatively configured to selectively lock the gripping member in a fixed position relative to the arm.

7. The carrier of claim 1, wherein a ratcheting mechanism is configured to selectively lock the gripping member in a fixed position relative to the arm.

8. The carrier of claim 1, further comprising a hitch mount.

9. The carrier of claim 1, further including a roof-rack mount.

10. The carrier of claim 2, wherein the terraced sidewalls extend from the upper rim to the continuous lower rim.

11. A carrier for a bicycle, comprising:
a rigid elongate body having a longitudinal axis extending from a front portion through a rear portion, wherein the front portion includes a wheel well configured to support a first wheel of the bicycle, and the wheel well includes an upper rim, a continuous lower rim that is smaller than the upper rim and circumscribes a continuous opening through the rigid elongate body, and graduated sidewalls that extend from the upper rim to the continuous lower rim;
a wheel brace pivotably connected to the rigid elongate body adjacent the wheel well and configured to pivot about an axis perpendicular to the longitudinal axis of the rigid elongate body, between a stowed position in which the wheel brace is adjacent the rigid elongate body, and a carrying position in which the wheel brace is substantially upright for supporting the first wheel, wherein the wheel brace and a feature of the wheel well are configured to cooperatively cradle the first wheel, wherein the feature of the wheel well is the graduated sidewalls or the continuous lower rim;
an arm pivotably connected to the rigid elongate body near a rear portion of the wheel well; and
a gripping member selectively moveable along a length of the arm for securing the first wheel in cooperation with the wheel brace and the feature of the wheel well.

12. The carrier of claim 11, further comprising a wheel holder located at the rear portion of the rigid elongate body and configured to support another wheel of the bicycle.

13. The carrier of claim 11, wherein the graduated sidewalls are adapted to secure tires having different widths.

14. The carrier of claim 11, further comprising a hitch mount.

15. The carrier of claim 11, further comprising a roof-rack mount.

16. The carrier of claim 11, wherein the graduated sidewalls include opposing bridge portions, and the feature of the wheel well is the opposing bridge portions of the graduated sidewalls.

17. A carrier for a bicycle, comprising:
a rigid elongate body extending along a longitudinal axis from a first end to a second end and including an upper surface, a lower surface, and first and second regions, wherein:
the first region extends along the longitudinal axis from the first end to the second region and the second region extends along the longitudinal axis from the first region to the second end;

the first region of the rigid elongate body is enlarged relative to the second region in at least one direction transverse to the longitudinal axis;

the upper surface of the rigid elongate body is at least partially cutaway on the first region to provide a wheel well configured to support a first wheel of the bicycle, the wheel well includes an interior surface; and the rigid elongate body includes an opening extending therethrough from the interior surface of the wheel well to the lower surface of the rigid elongate body, with the opening having a continuous edge that circumscribes the opening;

a wheel brace pivotably mounted to the rigid elongate body proximate the wheel well and configured to pivot about an axis transverse to the longitudinal axis of the rigid elongate body between a stowed position in which the wheel brace is at least partially disposed within the wheel well and a carrying position in which the wheel brace is substantially upright for supporting the first wheel;

a wheel holder mounted to the rigid elongate body proximate the second end and configured to receive and retain a second wheel of the bicycle;

an arm pivotably connected to the rigid elongate body near the wheel well; and a gripping member selectively positionable along a length of the arm to engage an upper part of the first wheel and retain the first wheel against the wheel brace and the interior surface of the wheel well.

18. The carrier of claim 17, wherein the interior surface of the wheel well includes graduated sidewalls that extend from the upper surface of the rigid elongate body to the edge of the opening, the gripping member retains the first wheel against the wheel brace and the edge of the opening when the first wheel includes a road tire, and the gripping member retains the first wheel against the wheel brace and the graduated sidewalls when the first wheel includes a mountain tire.

19. The carrier of claim 17, wherein the interior surface of the wheel well has terraced sidewalls that include at least first substantially upright opposing portions separated by a first width and second substantially upright opposing portions separated by a second width that is narrower than the first width, and the first substantially upright opposing portions are connected to the second substantially upright opposing portions by opposing bridge portions that are less upright than either the first substantially upright opposing portions or the second substantially upright opposing portions.

20. The carrier of claim 19, wherein the gripping member retains the first wheel against the wheel brace and between the second substantially upright opposing portions when the first wheel includes a road tire, and the gripping member retains the first wheel against the wheel brace and the opposing bridge portions of the terraced sidewalls when the first wheel includes a mountain tire.

21. The carrier of claim 17, wherein:

the first wheel has a first width;

the interior surface of the wheel well includes sidewalls that extend from the upper surface of the rigid elongate body to the edge of the opening and include at least first substantially upright opposing portions separated by a second width and second substantially upright opposing portions separated by a third width that is narrower than the second width;

the first substantially upright opposing portions are connected to the second substantially upright opposing portions by opposing bridge portions that are less upright than either the first substantially upright opposing portions or the second substantially upright opposing portions;

the interior surface of the wheel well includes a bottom that extends between the second substantially upright opposing portions of the sidewalls;

the opening extends from the bottom of the wheel well to the lower surface of the rigid elongate body and has a fourth width that is no larger than the third width;

the gripping member retains the first wheel against the wheel brace and the opposing bridge portions when the first width is greater than the third width;

the gripping member retains the first wheel against the wheel brace and the bottom of the wheel well when the first width is less than the third width and greater than the fourth width; and the gripping member retains the first wheel against the wheel brace and the edge of the opening when the first width is less than the fourth width.

* * * * *